Sept. 14, 1937.  C. G. OLSON  2,093,172
TAPPING SCREW
Filed March 25, 1935  2 Sheets-Sheet 1

Inventor:
Carl G. Olson
By:- Cox & Moore
attys.

Sept. 14, 1937.  C. G. OLSON  2,093,172
TAPPING SCREW
Filed March 25, 1935   2 Sheets-Sheet 2
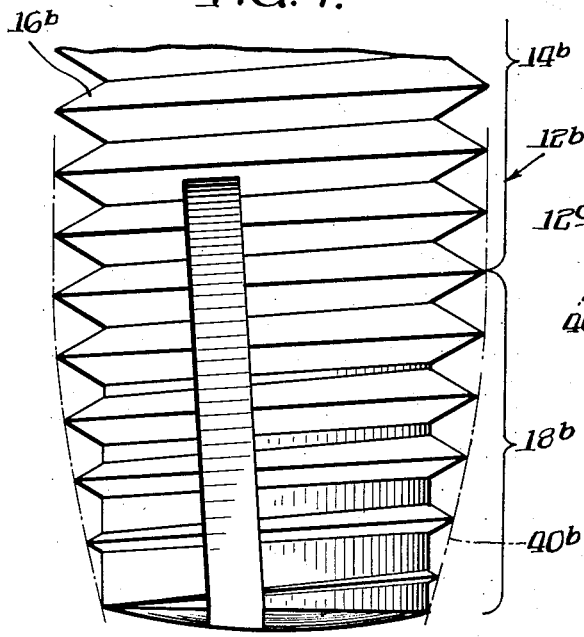
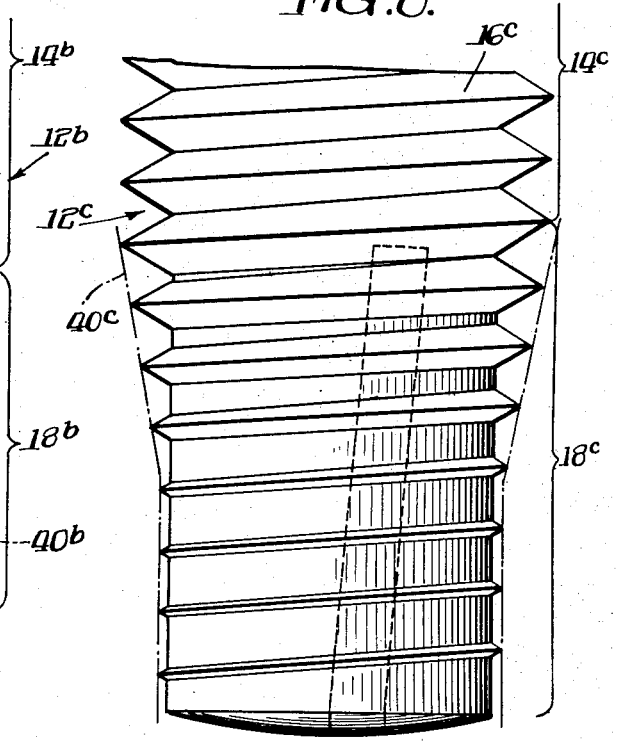
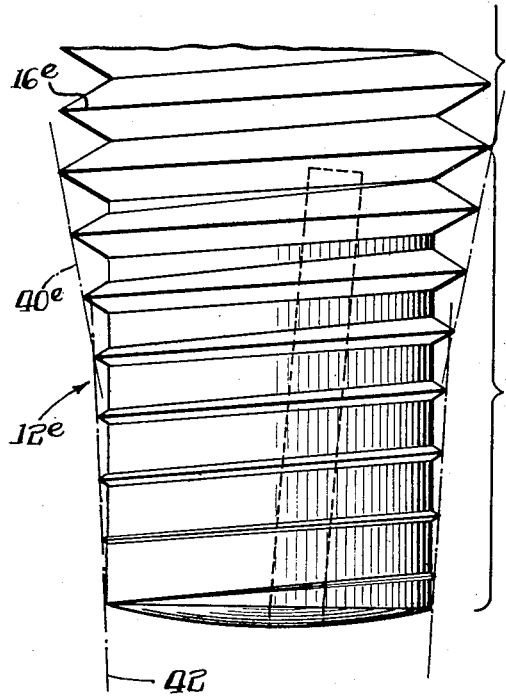
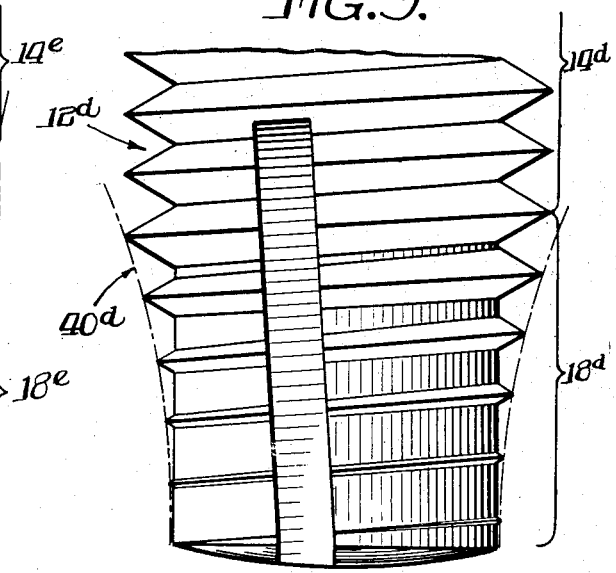
Inventor:-
Carl G. Olson
By: Cox & Moore
attys Patented Sept. 14, 1937

2,093,172

UNITED STATES PATENT OFFICE 2,093,172

TAPPING SCREW

Carl G. Olson, Chicago, Ill., assignor to Illinois Tool Works, Chicago, Ill., a corporation of Illinois Application March 25, 1935, Serial No. 12,778

8 Claims. (Cl. 85—47)

This invention relates generally to fasteners, and more particularly to fasteners of the self-tapping type adapted for use in unthreaded apertures of relatively hard substances, such as metal, bakelite, fibre, etc.

It is one of the important objects of my invention to provide self-tapping screw fasteners in which the hardened threads and body are so configurated as to facilitate the initial application of the fastener to an unthreaded aperture in a work piece.

It is a further object to provide a screw fastener, as set forth above, the threads of which may be readily produced by practicing a thread rolling process, which process consists of rolling a screw blank between dies.

Another object of my invention is to provide a screw fastener in which the crown or diametrical portions of the thread convolutions are uniform in cross sectional contour from one end of the screw to the other, and in which the root diameter of the screw is constant over that portion which carries the thread.

More specifically, my invention contemplates improvements in self-tapping screw fasteners which are provided with a cylindrical portion having a machine thread of uniform height and a tapping or entering portion wherein the thread diminishes in height, the root diameter being constant.

Still another object is to provide a fastener, as above set forth, in which the machine screw threads along the cylindrical core are full threads and the thread convolutions along the tapping portion constitute thread sections diminishing in height toward the entering end of the screw and conforming in cross sectional contour with the outer or peripheral sections of the full thread, the pitch of the thread being substantially constant over the entire extent thereof.

Another object is to provide a screw fastener, as above set forth, in which the thread convolutions on the tapping or entering portion are separated by exposed core surfaces increasing in width toward the entering end of the screw.

The foregoing and numerous other objects and advantages will be more apparent from the following detailed description when considered in connection with the accompanying drawings, wherein—

Figure 7 is a fragmentary enlarged side elevational view of a fastener in which the height of the thread at the entering end diminishes at a rate slightly differing from the entering convolutions of the thread of Figures 1 to 6, inclusive;

Figure 8 is a further modification of the thread wherein the convolutions toward the entering end are maintained at a constant diminished height;

Figure 9 is a similar view disclosing a thread which diminishes in height at a rate differing from the thread shown in Figures 1 to 6, inclusive; and Figure 10 discloses a still further modification of the diminishing thread arrangement.

Figure 1:
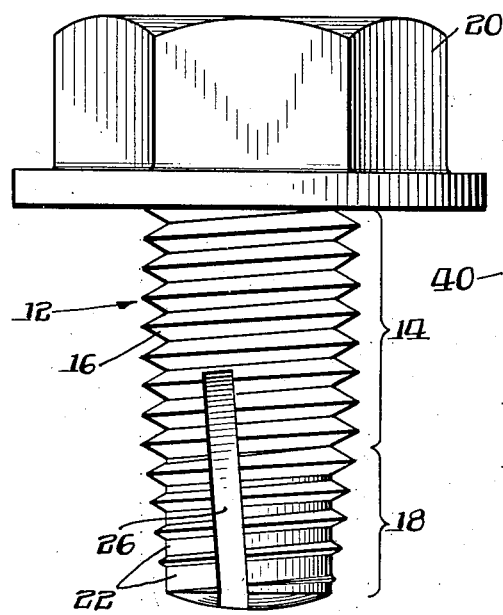
Figure 1 is a side elevational view of a tapping screw fastener embodying features of my invention.

Referring now to the drawings more in detail wherein like numerals have been employed to designate similar parts throughout the various figures, it will be seen that one embodiment of my invention disclosed in Figures 1 to 4, inclusive, contemplates a screw fastener including a screw body 12, which comprises a cylindrical portion 14 having a thread 16 of uniform height, and a tapping or entering section 18 in which said thread diminishes in height toward the entering end of the screw. A suitable head 20 joins the upper end of the screw section or portion 14.

Particular attention is directed to the fact that, while the portion of the thread 16 which extends along the portion 18 of the body 12 decreases in height, the root diameter, or the diameter of the screw stock from the bottom of one thread to the bottom of the oppositely disposed thread, is constant. Stating it another way, the thread 16, while it diminishes in height toward the entering end of the screw, never extends below the root diameter or core of the screw.

It will also be noted that the pitch of the thread measured in parallelism with the screw axis remains constant, even though the height of the thread diminishes. In other words, the distances between the crowns or outer edges of adjacent convolutions of the thread 16 remain substantially constant. It will be noted, however, that the distance between the convolutions measured along the line 40, Fig. 3, and indicated by the letter X, is slightly greater than the axial pitch indicated by the letter P. Thus, while the axial pitch of the thread, namely, the distance between the convolutions measured along a line parallel to the axis of the screw remains constant throughout the length of the screw, the distance X between the convolutions on the tapping portion is slightly greater than the distance P. It will be readily apparent from Figure 4, that the cross sectional contours of the crowns of the thread convolutions are identical. That is to say, even though the height of the thread with respect to the screw core decreases, the cross sectional shape does not vary. The root or core diameter of the screw is designated by the letters R.D. Likewise, the V-shape or angle of the thread I have indicated by the letter A, and it will be noted that this angle never varies. Thus, it may be said that this screw conforms with a conventional machine screw, except that the entering end partakes of a conical form to facilitate the entrance of the screw in a work piece, and only the outer portions of the standard thread convolutions are employed at the entering end of the screw.

It will be noted that, as the standard machine screw thread 16 begins to reduce in height and the root or core diameter is maintained constant, a cylindrical surface portion 22, gradually increasing in width toward the entering end, is presented between the thread convolutions of diminishing height. In fact, as the thread finally fades away at the very extremity of the screw, a considerable peripheral core surface is presented.

Figure 5:
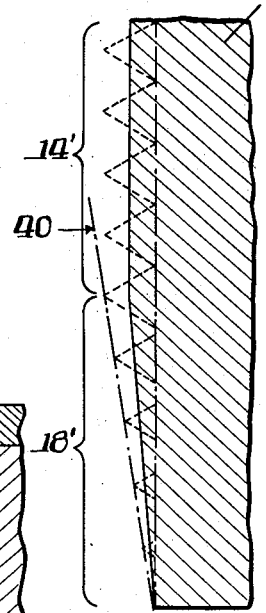
Figure 5 illustrates the manner in which the thread on the fastener may be rolled upon a tapered screw blank.

To more clearly illustrate the manner in which my improved thread is produced upon a screw blank, reference is made to Figure 5 wherein a fragmentary cross sectional view of a screw blank 24 is shown. This blank includes a section 14' and a slightly tapering section 18'. The external diameter of the section 14' of the blank corresponds substantially with the pitch diameter of the completed screw, and the section 18' tapers down to the root or core diameter of the screw. When this blank is rolled between dies, the serrations or teeth of which are indicated by the dotted lines in Figure 5, it will be seen that the material of the blank will flow in such a manner as to fill the spaces between the serrations of the die and thus produce a finished thread conforming in cross sectional contour with the dotted lines of Figure 5. This method of rolling thread differs from the conventional method of rolling tapered blanks between conventional parallel dies having serrations or teeth of uniform height. When the thread is rolled on a tapered blank by using conventional parallel dies having serrations of uniform height, unfilled thread convolutions present themselves toward the entering end of the screw. By employing my improved method of rolling, a machine screw thread is formed, the crown of which remains full and uniform in cross sectional contour and the diameter of the screw core extending between the bottom of the threads is maintained constant, thus affording maximum screw strength.

I have disclosed the above described thread in association with a screw having a longitudinal recess 26. This recess 26 is so disposed as to present a serrated cutting edge 28. When the screw is initially turned within the aperture 30 of a work piece 32 (Figure 4), the edge 28 functions to cut away material in the work, like a tap. In the particular embodiment disclosed in Figures 1 to 4, inclusive, the recess 26 separates the screw body into two sections 34 and 36. As the screw fastener is initially turned within the work piece 32, the screw section 34 yields toward the section 36 so as to increase the cutting effectiveness of the cutting edge 28. Obviously the invention is not limited to this particular form of recessed construction. The effective portion of the recess 26 is positioned at the entering end of the screw whereby to enable the holding or cylindrical portion 14 of the screw body to firmly grip the complementary thread in the work 32. The aperture 30 is usually made slightly larger than the root diameter of the screw, and it will be seen that the entering portion of the thread 16, being of relatively small height and gradually increasing to full height, facilitates the tapping operation of the screw. In other words, the load to which the screw is subjected as a result of the metal removing process is gradually applied by first cutting a small V-shaped portion and then successively cutting larger V-shaped portions. By employing standard machine screw threads, as distinguished from conventional wood screw threads, the ease with which the screw may be initially turned within the work is materially expedited. In the first place, the machine screw thread presents more starts per unit of length, and, secondly, the thread convolutions are more closely positioned, and hence counteract the tendency for the screw to cant or tilt as it is initially turned within the aperture of the work. After the screw has tapped its way through the work piece 32, the head 20 may be clamped against the part 38 to firmly secure said part to the member or part 32.

Figure 3:
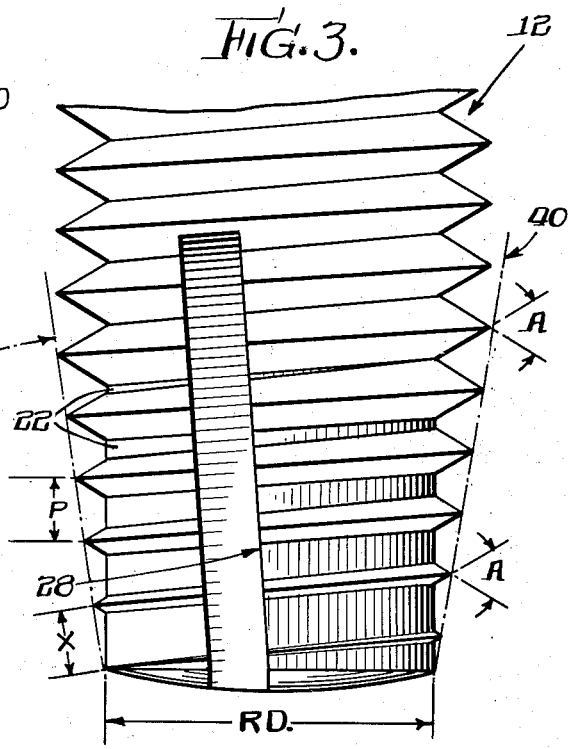
Figure 3 is an enlarged elevational view of the entering or tapping end of the fastener in Figure 1.
Figure 2:
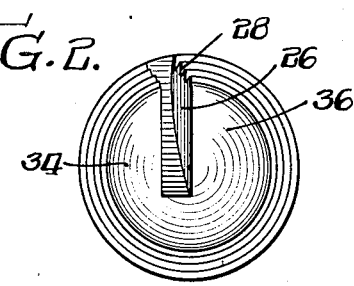
Figure 2 is a bottom view of the screw portion of the fastener shown in Figure 1.
Figure 6:
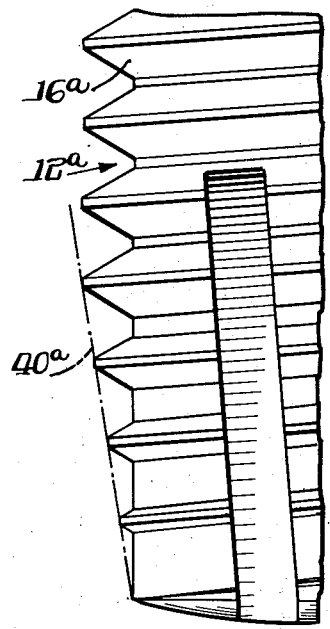
Figure 6 is an enlarged fragmentary side elevational view (similar to Figure 3) disclosing a fastener provided with modified standard machine screw threads.
Figure 4:
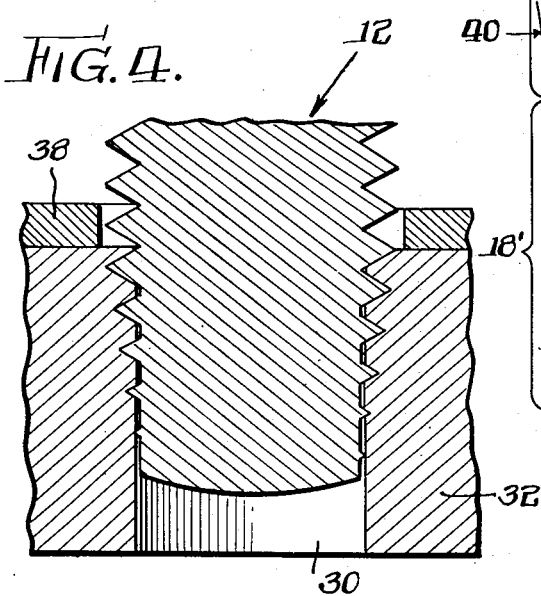
Figure 4 is a cross sectional view of the fastener partially inserted within a work piece to more clearly illustrate the manner in which the fastener taps its way into the work.

In Figure 6 I have fragmentarily illustrated a screw body 12a which conforms generally with the structure shown in Figure 3, differing only therefrom in the particular form of standard machine thread. The thread 16a of Figure 6 is commonly referred to as a flat type standard machine screw thread.

In Figure 7 I have shown a screw body 12b which includes a cylindrical or holding portion 14b and a tapping or entering portion 18b. The entering portion of the thread 16 (as shown in Figure 3) diminishes in height at a rate indicated by the straight dot-and-dash line 40, and, likewise, the tapering thread of the screw in Figure 6 follows the straight line variation indicated by the dot-and-dash line 40a. The thread 16b in Figure 7 decreases in height at a rate indicated by the slightly curved dot-and-dash line 40b. The structures of Figures 3 and 6 might be referred to as a conical form, whereas the structure of Figure 7 might be referred to as a "barrel-shaped" form.

In Figure 8 a still further thread modification is shown. The screw body is indicated by the numeral 12c and includes a cylindrical portion 14c and an entering or tapping portion 18c. It will be noted that the thread 16c first diminishes in height in accordance with a straight line variation, as indicated by the dot-and-dash line 40c of Figure 8. When the thread reaches a predetermined diminished height, or, in other words, a diameter which is slightly greater than the root diameter, this height is maintained until the thread terminates at the entering end of the screw. Attention is again directed to the fact that the pitch of the thread, as well as the cross sectional contour of the crown thereof remains constant, that is to say, conforms with standard machine screw requirements. Furthermore, the root diameter of the screw remains constant.

In Figure 9 a modification slightly differing from Figures 3 and 7 is disclosed. The screw body is indicated generally by the numeral 12d, which body includes a cylindrical portion 14d and a tapping or entering portion 18d. The thread diminishes in height in accordance with the variation indicated by a curved dot-and-dash line

40d having a curvature reverse to the curvature of the dot-and-dash line 40b of Figure 7. By having the thread diminish at the rate indicated in Figure 9, a more gradual start in the tapping operation takes place, and this may be preferable in applying the screw to certain classes of work.

In Figure 10 I have disclosed a still further modification wherein a screw body 12e comprises a cylindrical portion 14e and a tapping or entering portion 18e. The thread 16e first diminishes in height at the rate indicated by a dot-and-dash line 40e, and then at a rate indicated by a straight dot-and-dash line 42. Thus the crown of the thread at the entering end of the screw increases in height more gradually, and then increases in height at a more rapid rate. The thread does not extend below the root diameter, and the slightly tapered portion of the thread merges with the portion having the increased taper.

The above described screws, or at least the thread at the entering end of the screws, is preferably hardened to facilitate the cutting action in hard substances such as metal, bakelite, etc. Thus it will be apparent that the invention as just described contemplates a tapping screw fastener in which the elongated body is provided with a threaded cylindrical holding portion and a hardened threaded tapping portion at one extremity thereof. A head is provided at the opposite extremity of the threaded body and the thread along the holding and tapping portions is uniformly V-shaped in cross section and extends from the head to the entering end of the fastener. Further, this V-shaped thread on the tapping portion decreases in external diameter and also decreases in height with respect to the screw body to facilitate the initial application of the fastener to an unthreaded aperture in a work piece. Also, the recess extending longitudinally of the tapping portion presents a cutting edge and the effective portion of the recess terminates short of the head in order to enable a firm grip of the holding portion of the body in the work. It will also be apparent from the foregoing description that the crown or diametrical portions of the machine screw thread are substantially uniform in cross sectional contour, as clearly shown in Figures 1 to 10, inclusive. By having the arrangement of the standard machine screw thread as described, the fastener may be applied to any aperture equipped with standard machine screw threads. In other words, if the fastener has been removed it may be very readily reinserted, the thread of diminishing height, yet of the same cross sectional contour at the crown, provides a leader thread to guide the fastener into the threaded aperture. The exposed surfaces 22 of the screw core extending between the convolutions of the thread on the tapping portion and having a diameter equal to the root diameter, facilitates the ease with which said screw may be directed into an unthreaded aperture. The core surfaces 22 increase in axial width in proportion to the decrease in height of the thread on the tapping portion. Thus as the width of the core surface 22 increases from one convolution to another, the height of said convolutions proportionately decrease.

It will be apparent from the foregoing description that the invention contemplates a tapping screw having a cylindrical core from which a helical thread projects. The thread at the entering end tapers, whereas the core does not taper. In theory, a part of the thread on the tapping or tapering portion thereof, in effect, becomes buried in the cylindrical core and only a part of the thread projects beyond the surface of the core. Thus as the thread along the tapping portion extends toward the entering end of the screw, a greater portion thereof becomes, in effect, buried within or absorbed by the core. The part or section of the thread which projects outwardly from the core constitutes a continuation of an imaginary full thread and is therefore identical in form to corresponding portions of the thread on the main or holding portion of the screw.

It will also be understood that while the thread never extends below the root or core diameter, the theory of its formation involves a root profile corresponding with the diametrical outside profile and is a continuation of the root diameter of the thread on the holding portion of the screw in the same manner that the outside of the thread is a continuation of the outside of the thread on said holding portion, the only difference being that the width of the thread convolutions on the tapping portion of the screw progressively decreases due to the presence of the cylindrical core, the exposed surface 22 of which progressively increases in width proportionately with the decrease in width of the base of the projecting portion of the tapering thread.

It should also be understood that each of my V-shaped thread convolutions on the tapping portion of the screw presents a cutting edge at the recess 26 and these cutting edges increase in size as the thread recedes from the entering end of the screw. This is to be distinguished from conventional taps wherein a flat cutting edge slightly inclined with respect to the axis, does all of the cutting and diminishes in linear or axial width as the thread recedes from the entering end. Thus each V-shaped cutting edge on the tapping portion of my fastener is greater in length (adding together both sides of the V) than the complementary trailing edge of the thread section on the opposite side of the recess. In conventional taps each flat cutting edge is slightly less in axial width than the complementary trailing edge of the thread positioned on the opposite side of the flute.

I prefer to employ a recess, as for example, the recess 26, which is of a sufficient size to effectually dispose of the material cut away by the cutting edges. In other words, the fastener must be capable of being inserted by continuously turning it in a tightening direction without necessitating intermittent retrograde movement, as is frequently required when a conventional tap is employed.

Having thus described my invention, what I claim as new and desire to secure by Letters Patent is:

1. A tapping screw fastener including a body having a threaded holding portion and a hardened threaded tapping portion at one extremity thereof, a head connected at the opposite extremity of said body, said tapping portion being longitudinally recessed to present a cutting edge, the effective portion of said cutting edge terminating short of the head, the crown of the thread along the holding and tapping portions being of uniform cross sectional contour and extending from the vicinity of the head toward the entering end of the fastener, the axial pitch of said thread being uniform, the thread on the tapping portion gradually decreasing in crest diameter toward the entering end to facilitate its initial application to an unthreaded aperture in a work piece, and exposed peripheral core surfaces of varying axial widths extending between thread convolutions on said tapping portion.

2. A tapping screw fastener including a body having a threaded holding portion and a hardened threaded tapping portion at one extremity thereof, a head connected at the opposite extremity of said body, said tapping portion being longitudinally recessed to present a cutting edge, the effective portion of said cutting edge terminating short of the head, the thread along the holding and tapping portions being of the V-shaped type and extending from the vicinity of the head toward the entering end of the fastener, the axial pitch of said thread being uniform, the thread on the tapping portion gradually decreasing in crest diameter toward the entering end to facilitate its initial application to an unthreaded aperture in a work piece, and exposed peripheral core surfaces of varying axial widths extending between thread convolutions on said tapping portion.

3. A tapping screw fastener including a body having a threaded holding portion and a hardened threaded tapping portion at one extremity thereof, a head connected at the opposite extremity of said body, said tapping portion being longitudinally recessed to present a cutting edge, the effective portion of said cutting edge terminating short of the head, the thread along the holding portion being of the machine screw type, the axial pitch of said thread on the holding and tapping portions being uniform, the thread on the tapping portion gradually decreasing in crest diameter and cross-section toward the entering end to facilitate its initial application to an unthreaded aperture in a work piece, and exposed peripheral core surfaces extending between thread convolutions on said tapping portion.

4. A tapping screw fastener including a body having a threaded holding portion and a hardened threaded tapping portion at one extremity thereof, a head connected at the opposite extremity of said body, said tapping portion being longitudinally recessed to present a cutting edge, the effective portion of said cutting edge terminating short of the head, the crown of the thread along the holding and tapping portions being of uniform cross sectional contour and extending from the vicinity of the head toward the entering end of the fastener, the axial pitch of said thread being uniform, the thread on the tapping portion gradually decreasing in height toward the entering end to facilitate its initial application to an unthreaded aperture in a work piece, and exposed peripheral core surfaces of varying axial lengths extending between thread convolutions on said tapping portion.

5. A tapping screw fastener including a body having a threaded holding portion and a hardened threaded tapping portion at one extremity thereof, a head connected at the opposite extremity of said body, said tapping portion being longitudinally recessed to present a cutting edge, the effective portion of said cutting edge terminating short of the head, the thread along the holding portion being of the machine screw type, the axial pitch of said thread on the holding and tapping portions being uniform, the thread on the tapping portion gradually decreasing in crest diameter and cross-section toward the entering end to facilitate its initial application to an unthreaded aperture in a work piece, and exposed peripheral core surfaces extending between thread convolutions on said tapping portion, the diameter of said peripheral core surfaces being at least equal to the root diameter of the thread on the holding portion.

6. A tapping screw fastener including a body having a threaded holding portion and a hardened threaded tapping portion at one extremity thereof, a head connected at the opposite extremity of said body, said tapping portion being longitudinally recessed to present a cutting edge, the effective portion of said cutting edge terminating short of the head, the crown of the thread along the holding and tapping portions being of uniform cross sectional contour, the axial pitch of said thread on the holding and tapping portions being uniform, the thread on the tapping portion gradually decreasing in crest diameter and cross-section to the terminating entering end to facilitate its initial application to an unthreaded aperture in a work piece, and exposed peripheral core surfaces extending between thread convolutions on said tapping portion.

7. A tapping screw fastener including a body having a threaded holding portion and a hardened threaded tapping portion at one extremity thereof, a head connected at the opposite extremity of said body, said tapping portion being longitudinally recessed to present a cutting edge, the effective portion of said cutting edge terminating short of the head, said recess providing a yieldable screw section for increasing the cutting effectiveness of said edge when the fastener is applied to an unthreaded aperture, the thread along the holding portion being of the machine screw type, the axial pitch of said thread on the holding and tapping portions being uniform, the thread on the tapping portion gradually decreasing in crest diameter and cross-section toward the entering end to facilitate its initial application to an unthreaded aperture in a work piece, and exposed peripheral core surfaces extending between thread convolutions on said tapping portion.

8. A thread-forming fastener for metal work and the like including a body having a threaded holding portion and a threaded hardened thread-forming portion at one extremity thereof, a head connected at the opposite extremity of said body, the thread along the holding portion being of the machine screw type, the crown of the thread along the holding and thread-forming portions being of uniform cross sectional contour and extending from the vicinity of the head toward the entering end of the fastener, the axial pitch of said thread being uniform, the thread on the thread-forming portion gradually decreasing in crest diameter toward the entering end to facilitate its initial application to an unthreaded aperture in a work piece, and exposed peripheral core surfaces of varying axial widths extending between thread convolutions on said thread-forming portion, the diameter of said peripheral core surfaces being at least equal to the root diameter of the thread on the holding portion.

CARL G. OLSON.